(12) United States Patent
Okuma

(10) Patent No.: US 6,973,784 B2
(45) Date of Patent: Dec. 13, 2005

(54) HYDRAULIC MASTER CYLINDER

(75) Inventor: Hiroshi Okuma, Tokyo (JP)

(73) Assignee: Nabco, Ltd., (JP)

( * ) Notice: Subject to any disclaimer, the term of this patent is extended or adjusted under 35 U.S.C. 154(b) by 46 days.

(21) Appl. No.: 10/719,467

(22) Filed: Nov. 21, 2003

(65) Prior Publication Data

US 2004/0101425 A1    May 27, 2004

(30) Foreign Application Priority Data

Nov. 27, 2002 (JP) .............................. 2002-343634

(51) Int. Cl.[7] .............................................. F15B 7/08
(52) U.S. Cl. ...................................................... 60/588
(58) Field of Search .................................. 60/588, 562

(56) References Cited

U.S. PATENT DOCUMENTS

| | | | |
|---|---|---|---|
| 3,141,303 A | * | 7/1964 | Baldwin ....................... 60/588 |
| 3,473,330 A | | 10/1969 | Fritz |
| 5,715,681 A | * | 2/1998 | Williamson ................... 60/588 |
| 6,418,717 B1 | | 7/2002 | Christiaens et al. |
| 6,584,771 B2 | * | 7/2003 | Keller et al. .................. 60/588 |
| 6,769,254 B2 | * | 8/2004 | Heller et al. .................. 60/588 |

FOREIGN PATENT DOCUMENTS

| | | |
|---|---|---|
| EP | 0416753 | 3/1991 |
| FR | 1543045 | 10/1968 |
| GB | 541151 | 11/1941 |

* cited by examiner

Primary Examiner—Edward K Look
Assistant Examiner—Michael Leslie
(74) Attorney, Agent, or Firm—Gerald E. Hespos; Anthony J. Casella

(57) ABSTRACT

A master cylinder includes a cylinder main body forming a piston mount space and a piston mounted in the cylinder main body. An auxiliary supplying/discharging passage communicating sideways with the piston mount space is provided at a longitudinally middle portion of the cylinder main body. The inner circumferential surface of the cylinder main body and the outer circumferential surface of the piston are shaped such that a communication path communicating a pressure chamber near a supplying/discharging opening and the auxiliary supplying/discharging passage is formed at the outer side of a seal ring mounted on the piston with the piston moved back to a rearmost position most distanced from the supplying/discharging opening. The position of the piston and the pressure in the pressure chamber can be stabilized when the piston is located at a rearmost position from the supplying/discharging opening.

9 Claims, 4 Drawing Sheets

HYDRAULIC MASTER CYLINDER

BACKGROUND OF THE INVENTION

1. Field of the Invention

This invention relates to a hydraulic master cylinder used in a clutch controlling device of a vehicle or the like.

2. Description of the Related Art

Generally, in the case that gear is changed by a manual transmission in a vehicle, such a clutching operation is performed that a torque transmission from an engine to a transmission is interrupted by treading on a clutch pedal and the clutch pedal is released after gear is changed during the interruption to resume the torque transmission. A system, for example, as shown in FIGS. 6A and 6B is known as the one for realizing such a clutching operation.

In FIGS. 6A and 6B, a crank shaft 10 of an engine and a clutch shaft 12 are opposed to each other, and a flywheel 14 is fixed to the crank shaft 10, whereas a clutch plate 16 having a clutch disk 18 on its outer surface is so mounted on the outer surface of the clutch shaft 12 as to be displaceable along a longitudinal direction. A diaphragm spring 22 is mounted on the clutch shaft 12, and an elastic force thereof is transmitted to the clutch disk 18 via a pressure plate 20, whereby the clutch disk 18 is pressed against the flywheel 14 to keep the clutch coupled (see FIG. 6A).

The diaphragm spring 22 is pressed by a release fork 24 having a fulcrum of rotation at one end, and this release fork 24 is rotated as the clutch pedal 28 is treaded on. The clutch pedal 28 is mounted on a rotatable end of a pedal arm 27 rotatable about a supporting shaft 26, and the leading end of a rod 32 of a master cylinder 30 is coupled at an intermediate position of the pedal arm 27. A pressure chamber of this master cylinder 30 communicates with a pressure chamber of an operating cylinder 36 via a pipe 34, and a rod 38 of the operating cylinder 36 is coupled to a rotatable end of the release fork 24.

In this system, with the clutch pedal 28 released as shown in FIG. 6A, the elastic force of the diaphragm spring 22 is transmitted to the clutch disk 18 via the pressure plate 20 and the clutch disk 18 is pressed against the flywheel 14, whereby the clutch disk 18 and the flywheel 14 rotate together. In other words, a rotary force of the crank shaft 10 is transmitted to the clutch shaft 12 via a clutch mechanism.

As the clutch pedal 28 is treaded on as shown in FIG. 6B in this state, the rod 32 of the master cylinder 30 operates in a retracting direction and a hydraulic pressure created in the master cylinder 30 is transmitted to the operating cylinder 36 via the pipe 34. In turn, the rod 38 of the operating cylinder 36 operates in an elongating direction to rotate the release fork 24, thereby pushing a middle part of the diaphragm spring 22 toward the flywheel 14. In this way, the diaphragm spring 22 is deformed to free the pressure plate 20 and the clutch disk 18 from the pressed state. Then, the clutch disk 18 is separated from the flywheel 14 to separate the clutch shaft 12 and the crank shaft 10.

The master cylinder 30 provided in this system is internally provided with a piston 42 in a cylinder main portion and an unillustrated spring for biasing the piston 42 toward the rod 32. The rod 32 is pushed by the pedal lever 27 against a biasing force of this spring (see FIG. 6B), whereby the piston 42 functions to feed a hydraulic fluid in the cylinder main body to the operating cylinder 36. Accordingly, a clearance between the inner wall of the cylinder main body and the piston 42 needs to be fully sealed by a seal ring. However, if the pressure chamber (fluid chamber at the side of the piston 42 opposite from the rod 32; left fluid chamber in FIGS. 6A and 6B) of the master cylinder 30 is left constantly sealed by this sealing, the position of the clutch pedal 28 may undesirably change little by little due to the abrasion of the clutch disk 18.

Specifically, if the positions of the pressure plate 20 and the diaphragm spring 22 are displaced to left in FIG. 6A from the state of FIG. 6A due to the abrasion of the clutch disk 18, the positions of the rod 38 and the piston of the operating cylinder 36 are also displayed to left from their initial positions, whereby the piston 42 and the rod 32 of the master cylinder 30 connected with the operating cylinder 36 via the pipe 34, and the clutch pedal 28 are also displayed to left in FIG. 6A. Conversely, if an excessive hydraulic fluid enters the pressure chamber, this results in an excessively increased pressure in this pressure chamber.

As a means for preventing changes in the position of the piston of the master cylinder 30 and that of the pedal resulting from such a change of the clutching mechanism with time and a change of the pressure in the pressure chamber, Japanese Registered Utility Model No. 2557889 (see $10^{th}$ paragraph of page 2 and FIG. 3 in this Utility Model) discloses that a filler opening used to supply oil as a hydraulic fluid is provided at side portion of a cylinder main body of a master cylinder, a check valve is incorporated into a piston in the cylinder main body, and the check valve is opened to communicate a pressure chamber with the filler opening only when the master cylinder is located at an extended position as shown in FIG. 6A (when the piston is located at a rearmost position most distanced from the filler opening).

If this master cylinder is used, the hydraulic fluid is supplied to the pressure chamber of the master cylinder 30 via the check valve and the filler opening by as much as a displacement, for example, even if the rod 38 of the operating cylinder 36 is displaced to left in FIG. 6A from the state of FIG. 6A. Thus, the position of the piston 42 and that of the clutch pedal 28 coupled to the piston 42 via the rod 32 are constantly held at specified positions.

In the master cylinder disclosed in the Utility Model, the check valve having a complicated construction needs to be incorporated into the piston since the hydraulic fluid is supplied to the pressure chamber with the piston located at the rearmost position. Further, as a means for opening the check valve when the piston is moved back to the rearmost position, it is necessary to fix a pin ("pin 8" in FIG. 3 of the Utility Model) penetrating the cylinder main body in a radial direction in the cylinder main body and to form an oblong hole ("oblong hole 6" in FIG. 3 of the Utility Model) in the piston to prevent an interference with the pin. Thus, the entire cylinder has a complicated construction and a larger number of parts, which leads to increased production costs and a difficulty in ensuring the sealing reliability.

SUMMARY OF THE INVENTION

It is an object of the present invention to provide a hydraulic master cylinder which is free from the problems residing in the prior art.

It is another object of the present invention to provide a hydraulic master cylinder which has a simple construction and can stabilize the position of a piston and a pressure in a pressure chamber when the piston is most retracted from a filler opening.

According to an aspect of the invention, a hydraulic master cylinder comprises a cylinder main body internally formed with a piston mount space extending in a longitudinal direction and formed at one end thereof along the longitudinal direction with a supplying/discharging opening for supplying and discharging a hydraulic liquid into and from the piston mount space; a piston mounted in the piston mount space; and a seal ring mounted on an outer circumferential portion of the piston to thereby cut off the flow of the hydraulic fluid at a sealing-contact position.

The cylinder main body is formed with an auxiliary supplying/discharging passage communicating sideways with the piston mount space. The inner circumferential surface of the cylinder main body and the outer circumferential surface of the piston are so shaped that a communication path for communicating a pressure chamber, which is a part of the piston mount space closer to the supplying/discharging opening than the seal ring, and the auxiliary supplying/discharging passage is formed at the outer side of the seal ring with the piston moved to a rearmost position most distanced from the supplying/discharging opening.

These and other objects, features and advantages of the present invention will become more apparent upon a reading of the following detailed description and accompanying drawings.

DETAILED DESCRIPTION OF THE PREFERRED EMBODIMENTS

A preferable embodiment of the present invention is described with reference to the accompanying drawings. A clutch system to which a master cylinder 30 according to an embodiment of the invention is applied is similar to the one shown in FIGS. 6A and 6B and no description is given thereon here. However, a hydraulic system to which the inventive master cylinder is applicable is not limited to the one shown in FIGS. 6A and 6B. The present invention is also applicable, for example, to a braking system of a vehicle.

Figure 1:
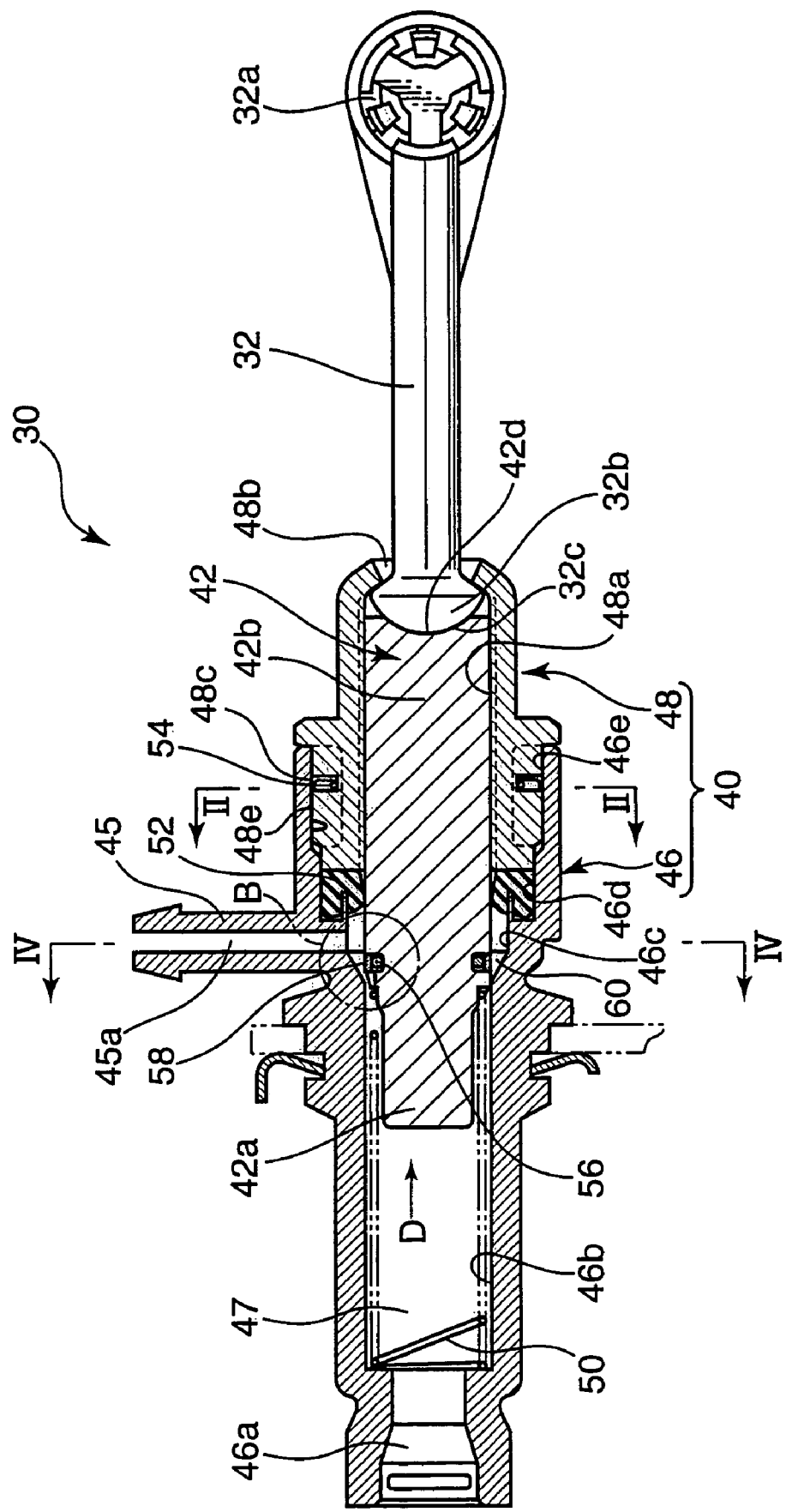
FIG. 1 is a front view of a master cylinder according to an embodiment of the present invention.
Figure 6A:
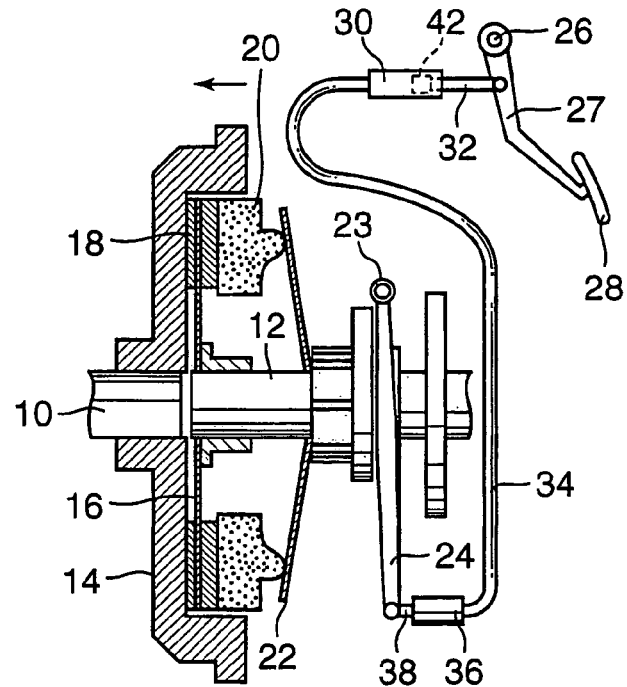
FIGS. 6A and 6B are construction diagrams showing an exemplary clutch system using a master cylinder.
Figure 6B:
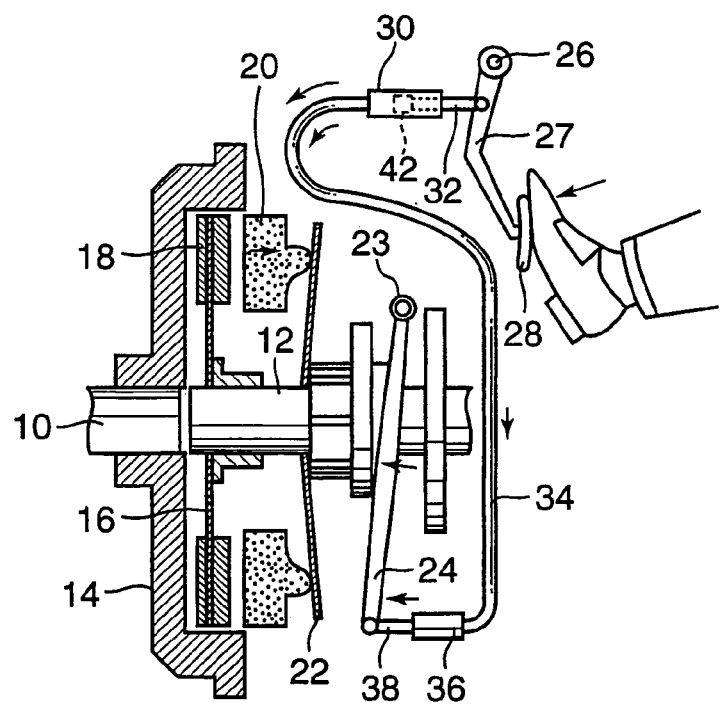

The master cylinder 30 of this embodiment is comprised of a cylinder main body 40, a piston 42 and a rod 32 for operating the piston 42 from outside as shown in FIG. 1, and a leading end 32a of this rod 32 is coupled to the pedal lever 27 of the clutch pedal 28 shown in FIGS. 6A and 6B.

The cylinder main body 40 is built by coupling a pressure-chamber side member 46 and a rod side member 48 in a longitudinal direction. Both members 46, 48 are substantially tubular and a piston mounting space extending in the longitudinal direction is defined inside with both members 46, 48 united.

Specifically, the pressure-chamber side member 46 includes a supplying/discharging opening 46a for supplying and discharging an hydraulic fluid, a pressure-chamber side inner circumferential surface 46b, an intermediate inner circumferential surface 46c, a sealing-member mounting inner circumferential surface 46e having a sealing member 52 fitted inside, a coupling inner circumferential surface 46e to be engaged with and coupled to the rod side member 48 from this order from the front end (left end in FIG. 1) of the member 46. The inner diameters of the respective elements of the pressure-chamber side member 46 are increased in the above order, thereby facilitating the removal of a mold after mold shaping. Further, a tubular auxiliary supplying/discharging pipe 45 is formed at a position of the pressure-chamber side member 46 near its rear end to extend radially outward from the outer circumferential surface, and an auxiliary supplying/discharging passage 45a is so formed inside this pipe 45 as to communicate sideways with the inner space of the intermediate inner circumferential surface 46c. This passage 45a is connected with a reservoir in the hydraulic system via an unillustrated pipe.

In this embodiment, the specific position of the auxiliary supplying/discharging passage 45a may be suitably set.

On the other hand, the rod side member 48 includes a piston mounting inner circumferential surface 48a having a large opening at its front side and a uniform inner diameter, and a rod insertion hole 48b through which the rod 32 is insertable is formed at the rear end of the rod side member 48.

Figure 2:
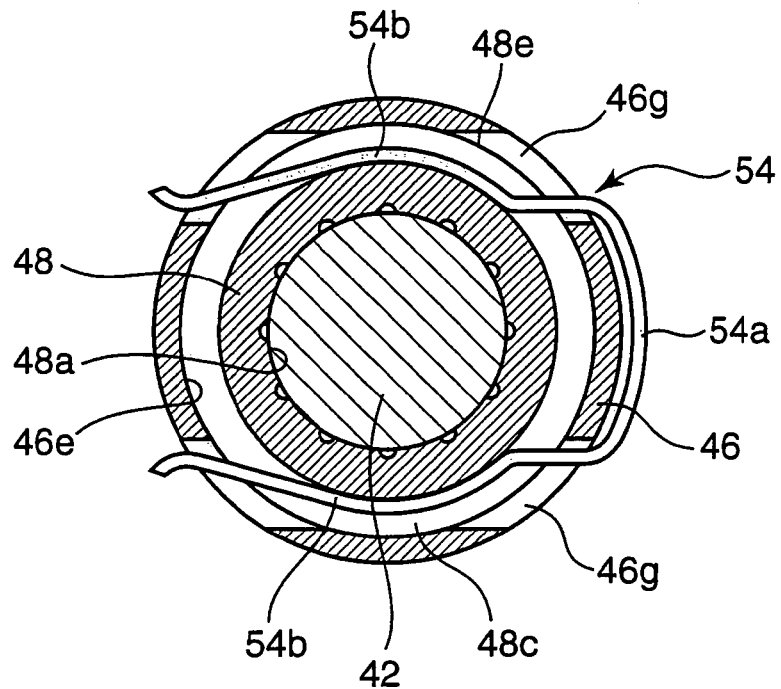
FIG. 2 is a sectional view taken along the line II—II in FIG. 1.

This rod side member 48 has a coupling outer circumferential surface 48e engageable with the coupling inner circumferential surface 46e of the pressure-chamber side member 46, and this engaged state is fixed by a fixing pin 54. Specifically, the fixing pin 54 includes a base portion 54a shaped to extend along the outer circumferential surface of the pressure-chamber side member 46, a pair of holding portions 54b extending substantially in the same direction from the opposite ends of the base portion 54a as shown in FIG. 2. An annular groove 48c is formed in the outer circumferential surface of the rod side member 48. The pressure-chamber side member 46 is formed with through holes 46g, which will face the annular groove 48c. The respective holding portions 54b are inserted into the through holes 46g and annular groove 48c to resiliently hold the rod side member 48 from above and below, thereby preventing the pressure-chamber side member 46 and the rod side member 48 from being disengaged in the longitudinal direction.

Further, a communicating inner circumferential surface having such recesses as to change the inner diameter thereof depending on its circumferential position is formed between the pressure-chamber side inner circumferential surface 46b and the intermediate inner circumferential surface 46c in the pressure-chamber side member 46.

Figure 3:
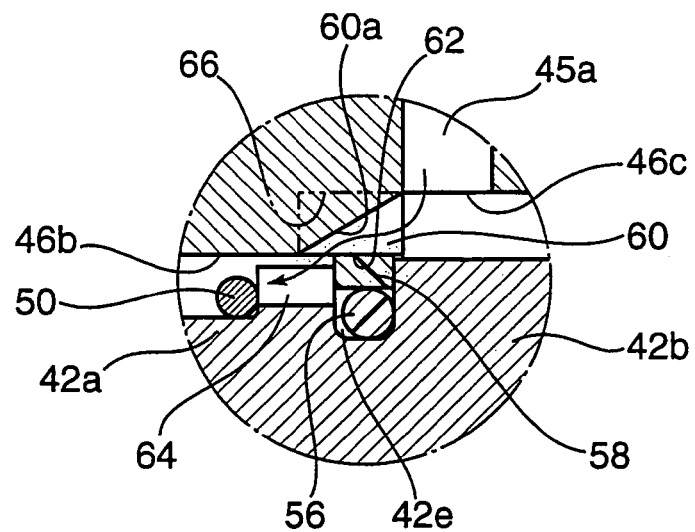
FIG. 3 is an enlarged view of a portion B in FIG. 1.
Figure 4:
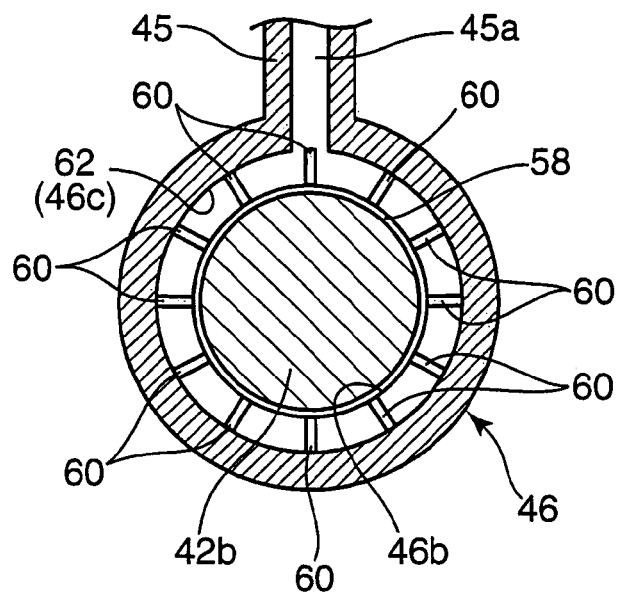
FIG. 4 is a sectional view taken along the IV—IV in FIG. 1.
Figure 5:
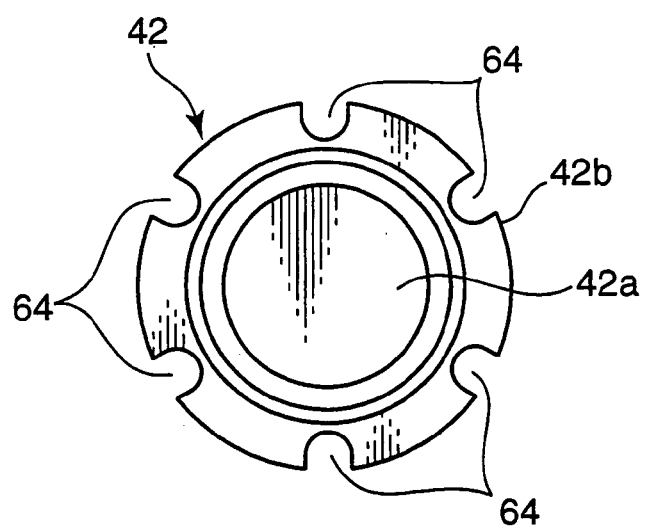
FIG. 5 is a diagram when viewed in the arrow D of FIG. 1.

This communicating inner circumferential surface is shown in detail in FIGS. 3 and 4. A plurality of (twelve in the shown example) communication grooves 60 are formed at circumferentially spaced-apart positions in the communicating inner circumferential surface. Inner circumferential surfaces 62 of parts of the communicating inner circumferential surface where no communication groove 60 is formed (minimum inner-diameter parts) have the same inner diameter as the pressure-chamber side inner circumferential surface 46b, whereas a bottom surface 60a of each communication groove 60 is formed into a slanted surface so that the inner diameter continuously changes from the inner diameter of the pressure-chamber side inner circumferential surface 46b to that of the intermediate inner circumferential surface 46c.

On the other hand, the piston 42 integrally includes a substantially cylindrical main body 42b and a substantially cylindrical small-diameter portion 42a projecting toward the front end (toward the supplying/discharging opening 46a) from the main body 42b.

A spherically recessed surface 42d is formed in the rear end surface of the main body 42b, whereas a base-end portion of the rod 32 is formed into a large-diameter portion 32b having a larger diameter than the rod insertion hole 48b and a leading end surface 32c of this large-diameter portion 32b is formed into a spherical surface engageable with the recessed surface 42d.

On the other hand, a compression coil spring 50 for biasing the piston 42 in a backward direction (direction away from the supplying/discharging opening 46a) is accommodated in a pressure chamber 47 which is an inner space of the pressure-chamber side inner circumferential surface 46b, and the recessed surface 42d and the leading end surface 32c of the large-diameter portion 32b can be held in pressing contact by an elastic force (biasing force) of this compression coil spring 50.

A seal-ring mounting groove 42e is formed over the entire circumference in the outer circumferential surface of the main body 42b near the small-diameter portion 42a, and an inner seal ring 56 and an outer seal ring 58 are mounted in this mounting groove 42e.

The inner seal ring 56 is made of a relatively soft elastic material such as a rubber into a ring shape, and mounted at the bottom of the seal-ring mounting groove 42e. On the other hand, the outer seal ring 58 is made of an elastic material having a higher hardness than the inner seal ring 56 (e.g. a synthetic resin) into a larger ring shape, and mounted at a radially outer side of the inner seal ring 56. In the mounted state of the outer seal ring 58, the outer circumferential surface of the outer seal ring 58 projects radially outward from the outer circumferential surface of the main body 42b of the piston 42.

A plurality of piston side communication grooves 64 are formed at circumferentially spaced-apart positions in the outer circumferential surface of a portion of the piston 42 located between the seal-ring mounting groove 42e and the small-diameter portion 12a. Each piston side communication groove 64 is so shaped as to be open toward the supplying/discharging opening 46a (leftward in FIG. 3), toward the seal-ring mounting groove 42e (rightward in FIG. 3) and toward the radially outer side of the piston 42 (upward in FIG. 3). The rear end of the compression coil spring 50 is held in contact with this boundary portion (stepped portion) between the portion where the seal-ring mounting groove 42e is formed and the small-diameter portion 42a.

The diameters (inner diameters) of the respective inner circumferential surfaces of the cylinder main body 40 are set with respect to this piston 42 as follows.

Diameter of the pressure-chamber side inner circumferential surface 46b:
   Such a diameter that the outer circumferential surface of the outer seal ring 58 comes into sealing contact with the pressure-chamber side inner circumferential surface 46b while undergoing an elastic deformation.

Diameter of the inner circumferential surface 60a of the part of the communicating inner circumferential surface where no communication groove 60 is formed (minimum inner-diameter part):
   Diameter equal to that of the pressure-chamber side inner circumferential surface 46b.

Diameter of the intermediate inner circumferential surface 46c:
   Such a diameter as to be radially spaced apart from the outer circumferential surface of the piston main body 42b, i.e. a diameter larger than the outer diameter of the piston main body 42b.

Diameter of the piston mounting inner circumferential surface 48a:
   Such a diameter that the piston main body 42b is fittable into the inner space of the piston mounting inner circumferential surface 48a substantially without defining any clearance.

The inner diameter of the sealing member 52 is set such that the sealing member 52 is held in sealing contact with the outer circumferential surface of the piston main body 42b while being elastically deformed, and a leak of the hydraulic fluid at the side of the intermediate inner circumferential surface 46b toward the rod 32 can be prevented by this sealing contact.

Next, the functions of this master cylinder 30 are described. The following description premises that the master cylinder 30 has air already removed and is filled with the hydraulic fluid.

FIG. 1 shows a state where the piston 42 is moved backward to the rearmost position most distanced from the supplying/discharging opening 46a by the elastic force of the compression coil spring 50. In the shown example, this rearmost position is a position where the leading end surface 32c of the large-diameter portion 32b of the rod 32 is in contact with the recessed surface 42d of the piston 42 and the large-diameter portion 32b is in contact with the end surface of the cylinder around the rod insertion hole 48b.

In this state, the rod 32 is most extended and the entire clutch system is in the state shown in FIG. 6A. In the cylinder main body 40, the outer circumferential surface of the outer seal ring 58 is in sealing contact with the inner circumferential surfaces 62 of the minimum inner-diameter parts of the communicating inner circumferential surface where no communication groove 60 is formed (state shown in FIG. 3), and the pressure chamber 47 communicates with the auxiliary supplying/discharging passage 45a via the piston side communication grooves 64 and the communication grooves 60. Accordingly, even if the hydraulic fluid in the pressure chamber 47 decreases due to the abrasion of the clutch plate 18 shown in FIG. 6A or increases, the hydraulic fluid is accordingly supplied from the unillustrated reservoir into the pressure chamber 47 through the auxiliary supplying/discharging passage 45a or, conversely, discharged from the pressure chamber 47. Thus, the pressure of the hydraulic fluid in the pressure chamber 47 is stable and the position of the piston 42 is constantly held at the rearmost position of FIG. 1.

When the clutch pedal 28 is treaded on in this state and the rod 32 operates in the retracting direction (leftward direction in FIG. 1), the piston 42 is pushed by the rod 32 and moved toward the supplying/discharging opening 46a against the elastic force of the compression coil spring 50.

At this time, the outer circumferential surface of the outer seal ring 58 is moved from the position where it is held in sealing contact with the inner circumferential surfaces 62 of the minimum inner-diameter parts of the communicating inner circumferential surface where no communication groove 60 is formed as shown in FIG. 3 to a position where it is held in sealing contact with the cylindrical pressure-chamber side inner circumferential surface 46b. The pressure chamber 47 comes to be sealed by this movement. Thus, the hydraulic fluid in the pressure chamber 47 is fed under pressure from the supplying/discharging opening 46a to the operating cylinder 36 shown in FIG. 6B, and this feed of the hydraulic fluid switches the state of the clutching system from a torque transmitting state shown in FIG. 6A to a torque cut-off state shown in FIG. 6B.

Thereafter, when the clutch pedal 28 is freed, the piston 42 is returned to the rearmost position shown in FIG. 1 by the elastic force of the compression coil spring 50 and the pressure chamber 47 comes to communicate with the auxiliary supplying/discharging passage 45a.

According to the master cylinder 30 described above, the piston 42 can be stably held at the rearmost position by communicating the pressure chamber 47 and the auxiliary supplying/discharging passage 45a via the communication grooves 60 located at the outer side of the seal rings 56, 58 even without providing the piston 42 with a check valve having a complicated construction as in the prior art.

The present invention is not limited to the master cylinder in which the communication grooves 60 are formed in the inner circumferential surface of the cylinder. For example, instead of forming the communication grooves 60, the inner circumferential surface of the cylinder may be spaced apart radially outward from the outer circumferential surface of the seal ring over the entire circumferential. However, the communicating inner circumferential surface is allowed to have such recesses and projections as to change the inner diameter depending on the circumferential position by providing the communication grooves 60 as shown. If the inner circumferential surfaces 62 of the minimum inner-diameter parts are designed to be held in sealing contact with the outer circumferential surface of the outer seal ring 58, the outer seal ring 58 can be smoothly moved from the communicating inner circumferential surface to the pressure-chamber side inner circumferential surface 46b. Further, a fluid flowing area between the pressure chamber 47 and the auxiliary supplying/discharging passage 45a when the piston 42 is at the rearmost position can be freely set by arbitrarily setting the width and the number of the respective communication grooves 60.

In the case of providing the communication grooves 60, their bottom surfaces 60a are not limited to the slanted shape as shown in solid lines in FIG. 3. For example, the bottom surfaces 60a may be parallel to the top surface as shown in phantom lines 66 in FIG. 3, so that the inner diameter is constant over the entire longitudinal range. Here, the slanted bottom surfaces 60a as shown in the solid lines in FIG. 3 have an advantage that the mold can be more easily removed from where the communication grooves 60 are formed, whereas the parallel bottom surfaces 60a as shown in the phantom lines 66 in FIG. 3 have an advantage of suddenly increasing the fluid flowing area between the pressure chamber 47 and the auxiliary supplying/discharging passage 45a when the piston 42 is returned to the rearmost position.

In the piston 42, the pressure chamber 47 and the auxiliary supplying/discharging passage 45a can communicate with each other even if the piston side communication grooves 64 shown in FIG. 3 are omitted. However, by providing the piston side communication grooves 64, an area of a communication path between the pressure chamber 47 and the auxiliary supplying/discharging passage 45a can be increased and the pressure in the pressure chamber 47 can be transmitted to the outer seal ring 58 and the inner seal ring 56, thereby brining both seal rings 56, 58 into pressing contact with a side surface (opposite from the pressure chamber 47) of the seal-ring mounting groove 42e. Therefore, the sealing property of the seal rings 56, 58 can be further improved.

Instead of the two inner and outer seal rings 56, 58, a signal seal ring may be used. However, if at least the inner and outer seal rings 56, 58 are provided as in the shown example, sealability in the seal-ring mounting groove 42e can be maintained high by using the relatively soft (easily deformable) elastic material for the inner seal ring 56, whereas the abrasion and damage of the outer seal ring 58 caused by the sliding contact with the inner circumferential surface of the cylinder can be suppressed by using the elastic material having a higher hardness than the inner seal ring 56. For example, in the case of the shown construction, the so-called "dragging" of corner portions of the outer seal ring 58 caused by the sliding contact can suppressed, with the result that good sealability can be maintained over a long period.

As described above, an inventive hydraulic master cylinder comprises a cylinder main body internally formed with a piston mount space extending in a longitudinal direction and formed at one end thereof along the longitudinal direction with a supplying/discharging opening for supplying and discharging a hydraulic liquid into and from the piston mount space; a piston mounted in the piston mount space in such a manner as to be movable by a restricted stroke along longitudinal direction; and a seal ring mounted on an outer circumferential portion of the piston in such a manner as to project more radially outward than the outer circumferential surface of the piston and held in sealing contact with the inner circumferential surface of the cylinder main body defining the piston mount space, thereby cutting off the flow of the hydraulic fluid at a sealing-contact position. The cylinder main body includes an auxiliary supplying/discharging passage communicating sideways with the piston mount space. The inner circumferential surface of the cylinder main body and the outer circumferential surface of the piston are so shaped that a communication path for communicating a pressure chamber, which is a part of the piston mount space closer to the supplying/discharging opening than the seal ring, and the auxiliary supplying/discharging passage is formed at the outer side of the seal ring with the piston moved to a rearmost position most distanced from the supplying/discharging opening.

With this construction, when the piston is operated toward the supplying/discharging opening from the rearmost position, the outer circumferential surface of the seal ring mounted on the piston approaches the supplying/discharging opening while being held in sealing contact with the inner circumferential surface of the cylinder main body, whereby the volume of the pressure chamber of the cylinder main body is reduced and the hydraulic fluid is fed under pressure from the supplying/discharging opening.

On the other hand, when the piston is returned to the rearmost position, the communication path communicating the pressure chamber and the auxiliary supplying/discharging passage of the cylinder main body is formed at the outer side of the seal ring. Thus, even if the hydraulic fluid enters the pressure chamber from the supplying/discharging opening or exits from the pressure chamber to the supplying/discharging opening in this state, for example, due to the abrasion of a clutch plate of a vehicle clutch, the hydraulic fluid in the pressure chamber can be reduced or increased through the auxiliary supplying/discharging passage and the communication path by as much as the hydraulic fluid having entered or existed. Therefore, the volume of the pressure chamber, i.e. the position of the piston can be always held constant.

More specifically, since the communication path communicating the pressure chamber and the auxiliary supplying/discharging passage is formed at the radially outer side of the seal ring in this master cylinder, the position of the piston can be stably held at the rearmost position only by a simple construction of setting the shapes of the outer circumferential surface of the piston and the inner circumferential surface of the cylinder main body such that the communication path is formed even without providing the piston with a check valve having a complicated construction as in the prior art.

Preferably, the inner circumferential surface of the cylinder main body defining the piston mount space may include a pressure-chamber side inner circumferential surface having such an inner diameter that the outer circumferential surface of the seal ring is in sealing contact therewith over the entire circumference and a communicating inner circumferential surface adjacent to a side of the pressure-chamber side inner circumferential surface opposite from the supplying/discharging opening and shaped such that at least a part thereof along circumferential direction is radially separated form the outer circumferential surface of the seal ring; an inner space of the communicating inner circumferential surface communicates with the communication path; and the position of the communicating inner circumferential surface is set such that the outer circumferential surface of the sealing ring faces the communicating inner circumferential surface with the piston located at the rearmost position.

With this construction, when the piston is operated toward the supplying/discharging opening, the pressure chamber is separated from the space behind the seal ring by the sealing contact of the seal ring mounted on the piston with the pressure-chamber side inner circumferential surface and the hydraulic fluid is fed into the pressure chamber from the supplying/discharging opening under pressure without any problem. On the other hand, when the piston is moved back to the rearmost position, the seal ring is separated from the pressure-chamber side inner circumferential surface to face the communicating inner circumferential surface. Thus, the pressure chamber and the auxiliary supplying/discharging passage come to communicate with each other through a clearance defined between the communicating inner circumferential surface and the outer circumferential surface of the seal ring.

In this construction, the communicating inner circumferential surface may, for example, have such a large inner diameter as to be separated radially outward from the outer circumferential surface of the seal ring over the entire circumference. However, the communicating inner circumferential surface more preferably has such recesses and projections as to change the inner diameter thereof depending on its circumferential position, and a maximum inner diameter thereof is set such that minimum inner-diameter parts of the communicating inner circumferential surface are held in sealing contact with the outer circumferential surface of the seal ring.

With this construction, the pressure chamber and the auxiliary supplying/discharging passage can communicate with each other through the clearance defined between the inner circumferential surfaces of parts of the communicating inner circumferential surface other than the minimum inner-diameter parts and the outer circumferential surface of the seal ring with the piston located at the rearmost position, whereas the seal ring can be smoothly moved from the communicating inner circumferential surface to the pressure-chamber side inner circumferential surface since the minimum inner-diameter parts constrain the seal ring from the radially outer side by coming into sealing contact with the outer circumferential surface of the seal ring.

More specifically, a plurality of communication grooves are preferably formed in the communicating inner circumferential surface while being circumferentially spaced apart, and parts of the communicating inner circumferential surface where no communication groove is formed are the minimum inner-diameter parts.

On the other hand, in the piston, it is preferable to form a seal-ring mounting groove in the outer circumferential surface thereof over the entire circumference and to mount the seal ring therein. With this construction, the seal ring can be stably mounted on the outer circumferential side of the piston.

In this case, it is more preferable that the piston includes a piston side communication path formed at a position closer to the supplying/discharging opening than the seal-ring mounting groove and open toward the supplying/discharging opening and toward a radially outer side of the piston, and the pressure chamber communicates with the auxiliary supplying/discharging passage via the piston side communication path with the piston located at the rearmost position. With this construction, a fluid flowing area between the pressure chamber and the auxiliary supplying/discharging passage can be increased by as large as the piston side communication path, enabling smooth supply and discharge of the hydraulic fluid into and from the pressure chamber when the piston is at the rearmost position.

More specifically, the piston side communication path preferably is formed at a plurality of positions spaced apart along the circumferential direction of the piston and is preferably open toward the supplying/discharging opening, toward the seal-ring mounting groove and toward the radially outer side of the piston. With this construction, the piston side communication path can be defined over a wide area up to the seal-ring mounting groove, thereby ensuring a larger fluid flowing area. Further, a sealing function of the seal ring can be advantageously enhanced by bringing the seal ring into pressing contact with a side surface (side surface opposite from the pressure chamber) of the seal-ring mounting groove using the pressure in the pressure chamber.

In the present invention, the seal ring may be a single seal ring, but it is more preferable that an inner seal ring made of an elastic material and an outer seal ring made of an elastic material having a higher hardness than that of the inner seal ring and mounted at a more radially outward position than the inner seal ring are mounted in the seal-ring mounting groove, and the outer seal ring projects radially outward from the outer circumferential surface of the piston to be held in sealing contact with the inner circumferential surface of the cylinder main body.

With this construction, higher sealability in the seal-ring mounting groove is maintained by making the inner seal ring made of the relatively soft (easily deformable) elastic material, whereas the abrasion and damage of the outer seal ring caused by the sliding contact with the inner circumferential surface of the cylinder can be suppressed by making the outer seal ring of the elastic material having a higher hardness than that of the inner seal ring.

This application is based on patent application No. 2002-343634 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A hydraulic master cylinder, comprising:
a cylinder main body internally formed with a piston mount space extending in a longitudinal direction and formed at one end thereof along the longitudinal direction with a supplying/discharging opening for supplying and discharging a hydraulic liquid into and from the piston mount space;
a piston mounted in the piston mount space in such a manner as to be movable by a restricted stroke along the longitudinal direction; and
a seal ring mounted on an outer circumferential portion of the piston in such a manner as to project more radially outward than the outer circumferential surface of the piston and held in sealing contact with the inner circumferential surface of the cylinder main body defining the piston mount space, thereby cutting off the flow of the hydraulic fluid at a sealing-contact position,
wherein:
the cylinder main body includes an auxiliary supplying/discharging passage communicating sideways with the piston mount space;
the inner circumferential surface of the cylinder main body and the outer circumferential surface of the piston are so shaped as to define a communication path for communicating a pressure chamber, which is a part of the piston mount space closer to the supplying/discharging opening than the seal ring, and the auxiliary supplying/discharging passage with the piston moved to a rearmost position most distanced from the supplying/discharging opening at the outer side of the seal ring;
the inner circumferential surface of the cylinder main body defining the piston mount space includes a pressure-chamber side inner circumferential surface having such an inner diameter that the outer circumferential surface of the seal ring is in sealing contact therewith over the entire circumference and a communicating inner circumferential surface adjacent to a side of the pressure-chamber side inner circumferential surface opposite from the supplying/discharging opening and shaped such that at least a part thereof along circumferential direction is radially separated form the outer circumferential surface of the seal ring;
an inner space of the communicating inner circumferential surface communicates with the communication path;
the position of the communicating inner circumferential surface is set such that the outer circumferential surface of the sealing ring faces the communicating inner circumferential surface with the piston located at the rearmost position; and
a seal-ring mounting groove is formed in the outer circumferential surface of the piston over the entire circumference, and the seal ring is mounted therein.

2. A hydraulic master cylinder according to claim 1, wherein the communicating inner circumferential surface has such recesses and projections as to change the inner diameter thereof depending on its circumferential position, and a maximum inner diameter thereof is set such that minimum inner-diameter parts of communicating inner circumferential surface are held in sealing contact with the outer circumferential surface of the seal ring.

3. A hydraulic master cylinder according to claim 2, wherein a plurality of communication grooves are formed in the communicating inner circumferential surface while being circumferentially spaced apart, and parts of the communicating inner circumferential surface where no communication groove is formed are the minimum inner-diameter parts.

4. A hydraulic master cylinder according to claim 3, wherein an inner seal ring made of an elastic material and an outer seal ring made of an elastic material having a higher hardness than that of the inner seal ring and mounted at a more radially outward position than the inner seal ring are mounted in the seal-ring mounting groove, and the outer seal ring projects radially outward from the outer circumferential surface of the piston to be held in sealing contact with the inner circumferential surface of the cylinder main body.

5. A hydraulic master cylinder according to claim 3, wherein the piston includes a piston side communication path formed at a position closer to the supplying/discharging opening than the seal-ring mounting groove and open toward the supplying/discharging opening and toward a radially outer side of the piston, and the pressure chamber communicates with the auxiliary supplying/discharging passage via the piston side communication path with the piston located at the rearmost position.

6. A hydraulic master cylinder according to claim 5, wherein an inner seal ring made of an elastic material and an outer seal ring made of an elastic material having a higher hardness than that of the inner seal ring and mounted at a more radially outward position than the inner seal ring are mounted in the seal-ring mounting groove, and the outer seal ring projects radially outward from the outer circumferential surface of the piston to be held in sealing contact with the inner circumferential surface of the cylinder main body.

7. A hydraulic master cylinder according to claim 5, wherein the piston side communication path is formed at a plurality of positions spaced apart along the circumferential direction of the piston and is open toward the supplying/discharging opening, toward the seal-ring mounting groove and toward the radially outer side of the piston.

8. A hydraulic master cylinder according to claim 7, wherein an inner seal ring made of an elastic material and an outer seal ring made of an elastic material having a higher hardness than that of the inner seal ring and mounted at a more radially outward position than the inner seal ring are mounted in the seal-ring mounting groove, and the outer seal ring projects radially outward from the outer circumferential surface of the piston to be held in sealing contact with the inner circumferential surface of the cylinder main body.

9. A hydraulic master cylinder, comprising:
a cylinder main body internally formed with a piston mount space extending in a longitudinal direction and formed at one end thereof along the longitudinal direction with a supplying/discharging opening for supplying and discharging a hydraulic liquid into and from the piston mount space;
a piston mounted in the piston mount space in such a manner as to be movable by a restricted stroke along the longitudinal direction; and
a seal ring mounted on an outer circumferential portion of the piston in such a manner as to project more radially outward than the outer circumferential surface of the piston and held in sealing contact with the inner circumferential surface of the cylinder main body defining the piston mount space, thereby cutting off the flow of the hydraulic fluid at a sealing-contact position,
wherein:
the cylinder main body includes an auxiliary supplying/discharging passage communicating sideways with the piston mount space;

a plurality of communication grooves are formed in the communicating inner circumferential surface while being circumferentially spaced apart, and parts of the communicating inner circumferential surface where no communication groove is formed are the minimum inner-diameter parts, and each of the communication grooves has a bottom which is inclined rearwardly;

the inner circumferential surface of the cylinder main body defining the piston mount space includes a pressure-chamber side inner circumferential surface having such an inner diameter that the outer circumferential surface of the seal ring is in sealing contact therewith over the entire circumference and a communicating inner circumferential surface adjacent to a side of the pressure-chamber side inner circumferential surface opposite from the supplying/discharging opening and shaped such that at least a part thereof along circumferential direction is radially separated form the outer circumferential surface of the seal ring;

an inner space of the communicating inner circumferential surface communicates with the communication path; and the position of the communicating inner circumferential surface is set such that the outer circumferential surface of the sealing ring faces the communicating inner circumferential surface with the piston located at the rearmost position.

* * * * *